United States Patent [19]

Sakin

[11] Patent Number: 5,237,969
[45] Date of Patent: Aug. 24, 1993

[54] IGNITION SYSTEM INCORPORATING ULTRAVIOLET LIGHT

[76] Inventor: Lev Sakin, 23941 Westhampton, Oak Park, Mich. 48237

[21] Appl. No.: 867,144

[22] Filed: Apr. 10, 1992

[51] Int. Cl.$^5$ ............................................ F02P 23/04
[52] U.S. Cl. ................................................. 123/143 B
[58] Field of Search ..................... 123/143 B, 536, 558

[56] References Cited

U.S. PATENT DOCUMENTS

| | | | |
|---|---|---|---|
| 4,035,131 | 7/1977 | Cerkanowicz | 431/6 |
| 4,043,308 | 8/1977 | Cerkanowicz | 123/143 R |
| 4,446,826 | 5/1984 | Kimura et al. | 123/143 B |
| 4,523,552 | 6/1985 | Mukainakano et al. | 123/143 B |
| 4,556,020 | 12/1985 | Hickling | 123/536 |
| 4,672,938 | 6/1987 | Hoppie et al. | 123/558 |
| 4,726,336 | 2/1988 | Hoppie et al. | 123/143 B |
| 4,947,640 | 8/1990 | Few et al. | 123/143 B |

FOREIGN PATENT DOCUMENTS

| | | | |
|---|---|---|---|
| 0087861 | 7/1980 | Japan | 123/143 B |
| 0093969 | 7/1980 | Japan | 123/143 B |

*Primary Examiner*—Willis R. Wolfe
*Attorney, Agent, or Firm*—Reising, Ethington, Barnard, Perry & Milton

[57] ABSTRACT

An ignition system (20) for an internal combustion engine (10) includes a spark plug assembly (21) having an optical passage (45) therethrough that allows an ultraviolet light beam (62) from a source (24) to enter the combustion chamber (8) and be directed to a gap (60) between two electrodes (36) and (38) that have a voltage differential applied therebetween to commence ignition in the combustion chamber.

28 Claims, 2 Drawing Sheets

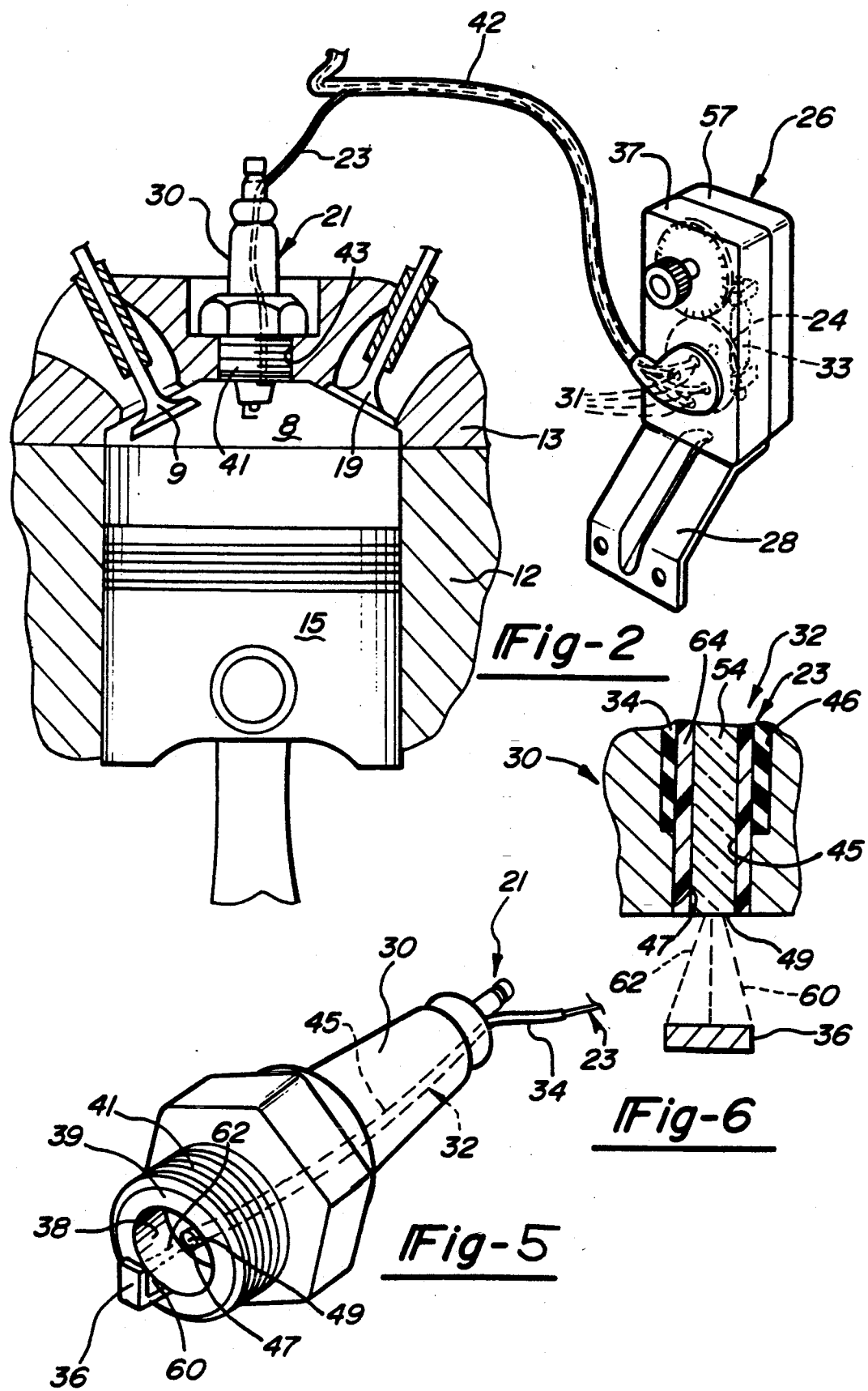

IGNITION SYSTEM INCORPORATING ULTRAVIOLET LIGHT

TECHNICAL FIELD

The field of this invention relates to internal combustion engines and more particularly to an improved ignition system that incorporates ultraviolet radiation for a motor vehicle engine.

BACKGROUND OF THE DISCLOSURE

In internal combustion engines, it is well known that one of the causes of low efficiency is incomplete combustion of the fuel-air blend commonly referred to as the fuel mixture. It is becoming more important to provide increased efficiency for motor vehicle engines because of the depleting supply of easily accessible natural oil resources and also because of environmental problems due to the emissions related to incomplete combustion.

Many efforts have been directed to improve the efficiency of motor vehicle engines including different ways to vaporizing fuel and mixing it with the incoming air. Efforts have also been directed to shaping the combustion chamber to provide maximum combustion. However, the efforts to create an optimally shaped combustion chamber and ideal blending of the fuel and air have been hampered due to the uncertainties of the time and location of the ignition spark.

Efforts have also been directed to incorporating ultraviolet radiation to stimulate the oxygen molecules being fed into the combustion chamber to precondition the oxygen atoms before ignition such that the oxygen atoms in the unburned fuel air blend stimulates the flame as it moves through the unburned mixture. Alternately, the ultraviolet light irradiates the flame and is absorbed by the flame and not by the unburned mixture. Ultraviolet radiation is also known to stimulate the fuel before entry into the combustion chamber to provide hypergolic combustion when the fuel enters the combustion chamber with previously introduced air. Other modifications provide irradiation of the fuel and oxygen within the combustion chamber to provide hypergolic combustion.

These methods all require extended light sources to irradiate large areas of the combustion chamber or the entire oxygen supply entering the combustion chamber. Extended sources require more power and are not as durable as point sources of ultraviolet radiation. Secondly, most of these ultraviolet enhanced combustion designs require incorporation of an extended ultraviolet light sources built into the engine block or cylinder head adjacent each combustion chamber. This proximity of the lamps to the combustion chamber require extensive redesign to the engine block and byliner heads.

These constructions, furthermore, require extensive repair costs if one of the light sources fails. The engine must be disassembled to replace or repair the failed ultraviolet lamp. Other constructions provide for a light source mounted within a wall of the combustion chamber. A separate light source is required for each combustion chamber.

Furthermore, none of the disclosed uses of ultraviolet light are directed to precisely locating the commencement of ignition or timing the commencement of ignition.

What is needed is an ultraviolet light ignition system that reduces the uncertainties associated with the commencement of ignition relating to time and location. What is also needed is a single source of ultraviolet light that supplies ultraviolet light to all combustion chambers of the engine. What is further needed is an ultraviolet light source that is conveniently mounted externally of the engine housing and transmits its light to the combustion chamber via an optical wave guide such as an optical fiber. Furthermore, what is needed is an ultraviolet light source that provides a beam of light directed to the gap between the electrodes of the spark plug to create a more powerful and longer spark to commence ignition within the combustion chamber without extensive redesign of the engine block or cylinder head.

SUMMARY OF THE DISCLOSURE

In accordance With one aspect of the invention, an ignition system for an internal combustion engine includes a ultraviolet light source mounted externally of an internal combustion engine housing. An optical wave guide such as a glass optical fiber has a first end mounted in proximity to the light source and a second end mounted to the engine housing for transmitting light from the light source to a combustion chamber within the engine housing.

Preferably, the wave guide directs the light as a beam to a gap between two electrodes of an igniter such as a spark plug that is operably mounted to the engine and in communication with the combustion chamber. The igniter is operably connected to a voltage source which applies a voltage differential between the two electrodes. A timing device selectively allows light from the light source to enter the combustion chamber when the voltage source applies the voltage differential between the spark plug electrodes such that resistance in the gap between the spark plug electrodes is lowered in the gap to cause an ignition spark in the gap between the electrodes. In one embodiment, the voltage source is a commercially available electronic ignition system supplying timed voltage pulses. In an alternate embodiment, a voltage source applies a constant voltage to the electrodes and the ignition is commenced by the introduction of the ultraviolet light in the gap between the electrodes.

In accordance with another aspect of the invention, a multi-cylinder internal combustion engine has a single ultraviolet light source. Each combustion chamber of the engine has an optical window for allowing entry of light therein. A plurality of wave guides such as optical fibers each has a first end mounted in proximity to a single light source and a second end mounted to transmit exciting light therefrom into respective combustion chambers of the engine. A timing device selectively transmits light from the light source to each combustion chamber to promote combustion within the combustion chamber. desirably, the timing device is interposed between the light source and the optical fibers to selectively transmit light through the optical fibers.

In accordance with another aspect of the invention, an igniter assembly includes a housing with a mounting mechanism to connect to an engine housing. Preferably, the igniter includes two electrodes passing therethrough with each electrode having a distal end to be positioned within a combustion chamber when the igniter housing operably installed to the engine housing. The igniter housing further has an optical passage therethrough. Preferably, the optical passage directs an ultraviolet light beam to a gap formed between the distal ends of the two electrodes. In one embodiment, the optical light beam to a gap formed between the distal ends of the two electrodes. In one embodiment, the optical light passage has an optical fiber passing substantially therethrough.

BRIEF DESCRIPTION OF THE DRAWINGS

Reference now is made to the accompanying drawings in which:

FIG. 2 is an enlarged schematic view of one cylinder and other components shown in FIG. 1;

FIG. 5 is a bottom perspective view of one spark plug assembly shown in FIG. 1; and FIG. 6 is a fragmentary and cross-sectional view of the optical window within the spark plug shown in FIG. 5.

DETAILED DESCRIPTION OF THE PREFERRED EMBODIMENT

Figure 1:
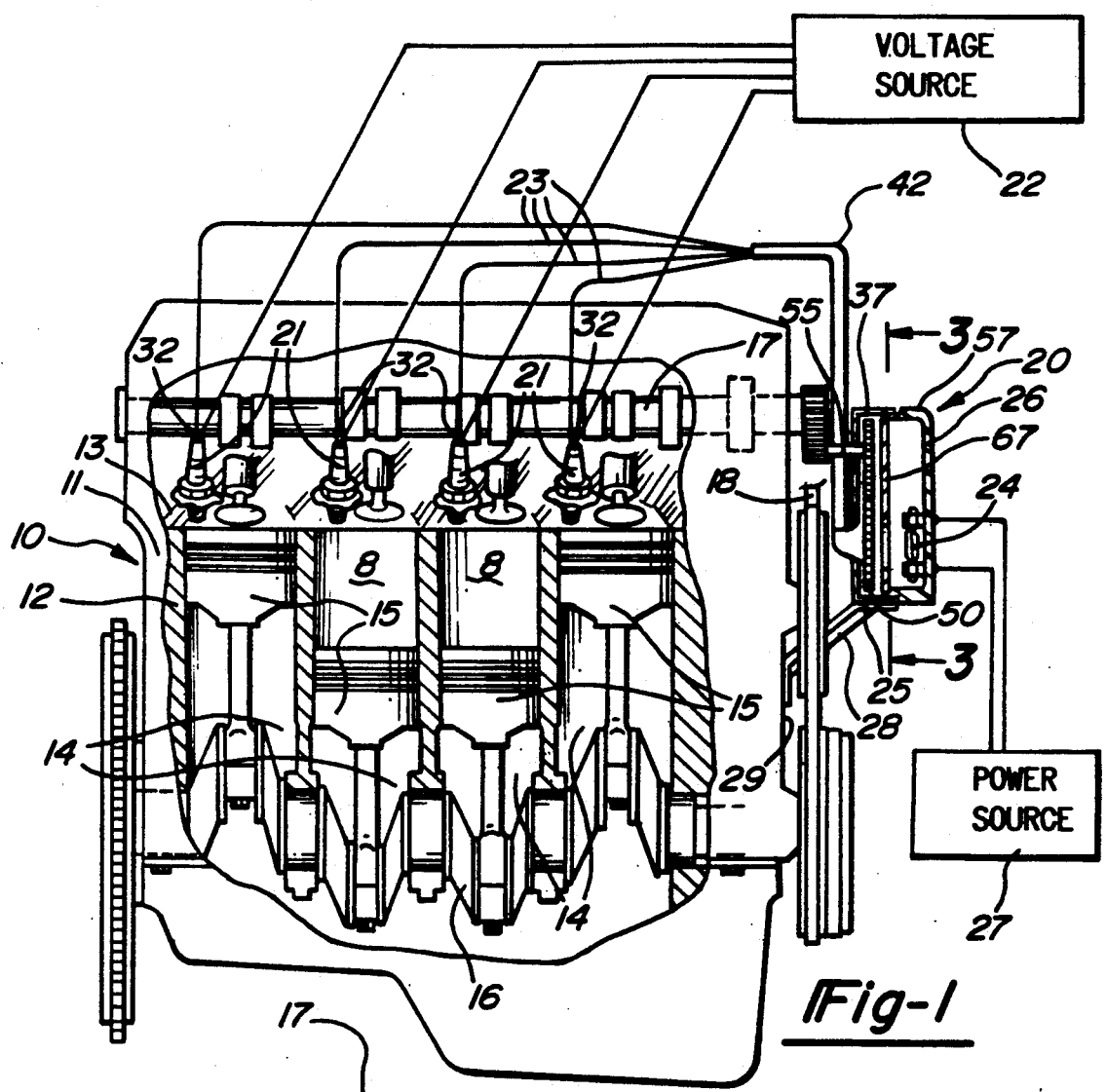
FIG. 1 is a schematic and partially segmented view of a four cylinder internal combustion engine incorporating one embodiment of the invention.

Referring now to FIGS. 1 and 2, an engine 10 for a motor vehicle has a housing 11 that includes an engine block 12 and cylinder head 13. The engine block 12 has cylinders 14 bored therein that slidably receive pistons 15 that are conventionally attached to a crankshaft 16. The block 12 and head 13 are joined together. The crankshaft 16 is conventionally attached to a camshaft 17 via belt 18 such that a four stroke cycle, commonly referred to as the Otto cycle, is provided. The camshaft 17 conventionally drives the intake valves 9 and outlet valves 19 that are seated in the cylinder head 13. A combustion chamber 8 is defined by appropriate surfaces of the piston 15, cylinders 14, cylinder head 13, valves 9 and 19 and spark plug assembly 21.

An ignition system, generally indicated as 20, includes as its major components, the spark plug assembly 21 connected to a voltage source 22, flexible optical fibers 23, an ultraviolet light source 24 and a timing device 25. Each cylinder 14 is identical in structure with only a difference in the phase of operation, i.e. timing of the Otto cycle. The ignition system 20 is now referenced to only one cylinder 14, as shown in FIG. 2, unless otherwise indicated with the understanding that the ignition system components for each cylinder 14 are identical.

Figure 4:
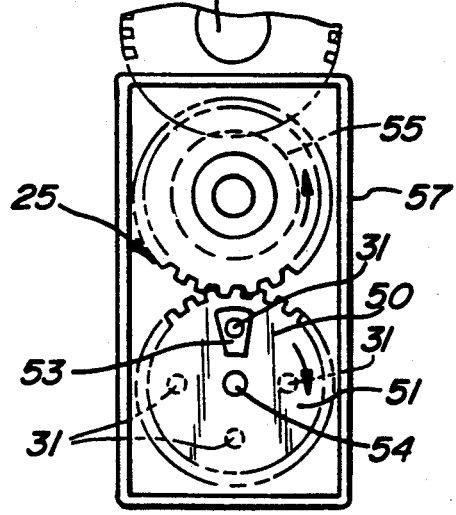
FIG. 4 is a cross-sectional and fragmentary view illustrating the shutter and optical fibers within the case shown in FIG. 2.
Figure 3:
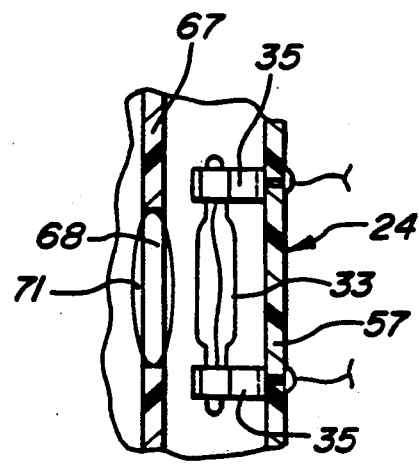
FIG. 3 is a fragmentary and segmented view of the case illustrating the ultraviolet lamp.

The ignition system, shown in FIG. 2, 3 and 4, has the ultraviolet light source 24 housed in an opaque case 26. The light source 24 may be commercially available high or low pressure short arc mercury lamp 33 that is operably connected to a power source 27. Alternately, a U-V fluorescent lamp can be a suitable substitute for the arc lamp 33. The case 26 is mounted externally of the engine housing 11. For convenience, the case 26 may be mounted on a bracket 28 that is attached to the exterior surface 29 of the engine housing 11. However, due to low transmission losses within fibers 23, the case 26 may also be mounted remotely from the engine, for example on a side wall of the engine compartment of the motor vehicle (not shown) or any other convenient and accessible location. Furthermore, the case 26 is constructed with two halves 37 and 57 that are snap fitted together. The two halves 37 and 57 can also be snapped apart to allow easy access to the interior of the case 26 and replacement of the lamp 33. The lamp 33 is removably mounted on metal spring terminals 35 as clearly shown in FIG. 3 which is operably wired to the power source 27. Other methods of providing an openable case are equally suitable. The case may have an openable door or the two halves may be removably secured together by fasteners.

The optical fibers 23 each have a first end 31 that extend into the case 26 and are positioned to receive the light emitting from the ultraviolet light source 24. Each fiber 23 has its other end 32 imbedded in a spark plug housing 30 to direct the light into the combustion chamber 8. Each fiber 23 is flexible to provide ease of installation. Each fiber 23 may be a commercially available fiber having a fused silica core 54, a transparent cladding 64 about the core 54 with a lower index of refraction and a protective coating 34 such as an opaque elastomeric sleeve extending from casing 26 to spark plug housing 30. The coated fibers 23 may be bundled together within a protective cable assembly and fitting 42 toward the case 26.

The timing device 25 provides for selective timing of the ultraviolet light to each combustion chamber 8. The timing device 25 includes a rotatably shutter 50 pivotally mounted on case half 37. The shutter 50 is interposed between the light source 24 and the first end 31 of optical fibers 23. The rotatable shutter 50 has an optically opaque sector 51 and optically transparent sector 53 that allows the light from source 24 to enter an end 31 of one of the fibers 23 when aligned over the respective end 31 as, shown in FIG. 4. The fibers 23 are arranged about the axis of rotation 54 of the shutter 50 in accordance with the firing sequence of the respective combustion chambers 8.

The shutter 50 is driven by a gear system 55 within the case 26 that in turn is driven by the camshaft 17. The transparent sector 53 is phased to rotate over a respective fiber end 31 of each fiber 23 when ignition in the respective combustion chamber 8 is desired. A light shield 67 is mounted in the case 26 between the lamp 33 and the shutter 50. The shield 67 has a aperture 68 therein that is approximately the size of the shutter 50. The aperture 68 may have a focusing lens 71 to help collimate the light to fiber ends 31. The shield helps collimate the light emanating from the lamp 33 to the shutter section 53.

The spark plug assembly 21 is shown in more detail in FIGS. 5 and 6. The assembly 21 includes the housing 30, two electrodes 36 and 38 mounted in proximity to an inner end 39 of the housing 30, an exterior thread 41 for mounting the housing 30 to the cylinder head spark plug aperture 43, an optical passageway 45 for receiving the second end 32 of the optical fiber 23. The optical fiber 23 passes substantially through the passageway 45 to the inner end 49 of the optical passageway 45. The passageway 45 is stepped having a larger diameter section 46 and a smaller diameter window section 47 leading to inner end 49. The second end 32 of the fiber 23 has its protective coating 34 stripped or cut to end within larger diameter section 46. The transparent core 54 and cladding 64 extend through section 47 and are fused therein. The optical fiber is commercially available. Its core 54 and cladding 64 are constructed to transmit ultraviolet wavelengths. The electrodes 36 and 38 are spaced apart to form a gap 60 therebetween. The window section 47 is positioned to be aimed at the gap 60.

In operation, the voltage supply 22 may be a commercially avilable electronic ignition system that provides a properly timed voltage pulse between the electrodes 36 and 38. The voltage pulse commences either simultaneously with or before the light beam 62 is transmitted to the gap 60 and continues until the light beam 60 ignites the mixture within the gap 60 to commence ignition. This voltage is not sufficient by itself to overcome the gap 60 with its normally and inherently high resistance when the fuel air mixture is in the combustion chamber 8.

Ultraviolet light from the source 24 is selectively transmitted through the fiber 23 at the appropriate time as determined by the shutter 50 to form a beam of light 62, as schematically shown in FIGS. 5 and 6, that exits the end 32 and is transmitted through window section 47 to the gap 60.

The presence of the ultraviolet light within gap 60 acts upon the fuel and air mixture at the gap 60, ionizes the mixture, and lowers the resistance within the gap 60 to create a spark between the electrodes 36 and 38. The created spark commences the ignition within the chamber 8.

While a voltage pulse has been described, it should be understood that the ignition system 20 may incorporate a voltage source 22 that provides constant voltage differential to the spark plug 21. The voltage is low enough such that it is insufficient to create a spark between the electrodes 36 and 38 without the assistance of the light beam.

The use of an ultraviolet light beam directed to the gap between two electrodes of an igniter to commence ignition resolves the problem of timing of the ignition. The transmitted light is the trigger for the ignition and travels at the speed of light, basically instantaneously for the purposes used, from the light source to the site of ignition to more precisely define the timing of the ignition. Present mechanical or electronic ignition systems may also be replaced by a simple constant voltage supply operably connected to the igniters.

Furthermore, the gap may be increased as compared to conventional spark plugs due to the lowering of resistance within the gap 60 by the introduction of the ultraviolet light. The lengthen gap provides for a longer ignition spark and consequently a more predictable elongated shape and position of the ignition spark.

The application of ultraviolet light only to the gap 60 does not require the power usage of previously known and disclosed systems which irradiate substantially the entire combustion chamber or all of the fuel or air entering the combustion chamber. The reduction in power is more consistent with presently available twelve volt electrical board systems found on most production motor vehicles.

The use of a single light source mounted externally of the engine housing provides for a convenient system to provide ultraviolet light to each combustion chamber of a multi-cylinder engine. The external mounting of the light source and timing device provides for incorporating an ultraviolet light ignition system without any need for redesigning present engine blocks or cylinder heads. The igniters may be threaded into existing mounts for conventional spark plugs. The external mounting of the light source also provides ease in repair or replacement of the light source 24.

While it has been shown that a single continuously on lamp used with a mechanical shutter provides a timing mechanism for introduction of ultraviolet light to the combustion chamber, it is also foreseen that multiple number of lamps may be mounted within case 26 with each lamp aligned with a respective optical fiber 23. The light pulse may be formed by the above described shutter or the lamps may be electronically controlled to flash at the appropriate time.

While a four cylinder reciprocal engine 10 is shown in the drawings, it should be understood that other engines may equally be used with the present invention. From the present disclosure, it is foreseen that the present invention may be easily applied to known single or multi-cylinder reciprocal cylinder engines. Furthermore, the present invention may also be applied to known rotary piston engines such as a Wankel engine.

It is also foreseen that the ultraviolet light source ignition system may be applied to diesel engines which use glow plugs or rely upon hypergoic ignition.

Other variations and modifications are possible without departing from the scope and spirit of the present invention as defined by the appended claims.

What is claimed is:

1. An ignition system for an internal combustion engine having an engine housing with at least one combustion chamber therein, a spark plug housing having two spaced electrodes operably positioned in the combustion chamber, a voltage source for applying a voltage differential between said spark plug electrodes; said ignition system characterized by:

an ultraviolet light source being positioned externally of said engine housing;

an optical wave guide being operably interposed between said light source and said combustion chamber for providing transmission of light from said light source to said combustion chamber;

said light from said wave guide being directed to a gap situated between said electrodes of said spark plug housing; and a timing device for selectively allowing light from said light source to enter said combustion chamber when said voltage source applies said voltage differential between said spark plug electrodes such that resistance in the gap between said spark plug electrodes is lowered by the presence of said light in said gap to trigger a spark ignition in said gap between said electrodes.

2. An ignition system as defined in claim 1 further characterized by:

said wave guide being an optical fiber that has one end mounted in proximity to said ultraviolet source and a second end mounted in proximity to said combustion chamber for allowing said light to enter said combustion chamber.

3. An ignition system as defined in claim 2 further characterized by:

said timing device including an optical shutter being interposed between said ultraviolet light source and said one end of said optical fiber.

4. An ignition system as defined in claim 2 further characterized by:

said second end of said optical fiber being connected to said spark plug and passing therethrough to transmit light to said combustion chamber.

5. An ignition system as defined in claim 1 further characterized by:

said voltage source being constructed to provide a substantially continuous and constant voltage differential between said electrodes; and said ignition timing being completely dependent on the timing for the introduction of said light in said gap between said electrodes.

6. An ignition system as defined in claim 1 further characterized by:

said voltage source being constructed to deliver a timed pulsed voltage differential between said electrodes.

7. An ignition system for an internal combustion engine having a housing with at least one combustion chamber therein, a spark plug housing having two spaced electrodes positioned in the combustion chamber with the distal ends of the electrodes spaced apart to form a gap therebetween, a voltage source for applying a voltage differential between said spark plug electrodes, said ignition system characterized by:

an ultraviolet light source for producing a beam of ultraviolet light;

said light beam from said light source being directed to said gap between said electrodes of said spark plug housing; and a timing device for selectively allowing light from said light source to enter said combustion chamber when said voltage source applies said voltage differential between said spark plug electrodes such that resistance in the gap between said spark plug electrodes is lowered by the presence of said light in said gap to trigger an ignition spark in said gap between said electrodes.

8. An ignition system as defined in claim 7 further characterized by:

an optical wave guide having one end mounted in proximity to said ultraviolet source and a second end mounted in proximity to said combustion chamber to transmit said ultraviolet light beam from said light source to said combustion chamber and be directed to said gap.

9. An ignition system as defined in claim 8 further characterized by:

said light source being positioned externally of said engine housing.

10. An ignition system as defined in claim 9 further characterized by:

said second end of said optical wave guide being mounted to said spark plug and passing therethrough to transmit light to said combustion chamber.

11. An ignition system as defined in claim 8 further characterized by:

said timing device including an optical shutter being interposed between said ultraviolet light source and said one end of said optical wave guide.

12. An ignition system as defined in claim 7 further characterized by:

said voltage source being constructed to provide a substantially continuous and constant voltage differential between said electrodes; and said ignition timing being completely dependent on the timing of the introduction of said light in said gap between said electrodes.

13. An ignition system as defined in claim 7 further characterized by:

said voltage source being constructed to deliver a timed pulsed voltage differential between said electrodes.

14. In an internal combustion engine having a housing with a plurality of combustion chambers, the improvement characterized by:

a single ultraviolet light source being positioned externally of said engine housing;

each combustion chamber having an optical pathway to provide entry of said light to said combustion chamber;

a plurality of optical wave guides having a first respective end mounted in proximity to said light source and a second respective end mounted in said optical pathway to said respective combustion chamber;

each combustion chamber including an igniter operably connected to a voltage source to form an ignition spark for ignition of combustion within said combustion chamber; and a timing device for selectively timing transmission of said light through said respective optical wave guides to each of said combustion chambers to promote combustion within said combustion chamber.

15. An internal combustion engine having a housing with a plurality of combustion chambers, the improvement characterized by;

a single ultraviolet light source being positioned externally of said engine housing;

each combustion chamber having an optical pathway to provide entry to said light to said combustion chamber;

a plurality of optical wave guides having a first respective end mounted in proximity to said light source and a second respective end mounted in said optical pathway to said respective combustion chamber;

a timing device for selectively timing transmission of said light through said respective optical wave guides to each of said combustion chambers to promote combustion within said combustion chamber;

said timing device including a movable optical shutter being interposed between said ultraviolet light source and said first respective ends for said optical wave guides.

16. An internal combustion engine having a housing with a plurality of combustion chambers, the improvement characterized by;

a single ultraviolet light source being positioned externally of said engine housing;

each combustion chamber having an optical pathway to provide entry of said light to said combustion chamber;

a plurality of optical wave guides having a first respective end mounted in proximity to said light source and a second respective end mounted in said optical pathway to said respective combustion chamber;

a timing device for selectively timing transmission of said light through said respective optical wave guides to each of said combustion chambers to promote combustion within said combustion chamber;

each combustion chamber including an igniter having two electrodes with a gap therebetween and having a voltage differential applied between said electrodes;

each of said respective optical pathways constructed to direct light from a respective wave guide to said gap between said electrodes such that the resistance between said electrodes is decreased upon the presence of said light such that an ignition spark is created between said electrodes in said gap.

17. An internal combustion engine having a housing with a plurality of combustion chambers, the improvement characterized by;
   a single ultraviolet light source being positioned externally of said engine housing;
   each combustion chamber having an optical pathway to provide entry of said light to said combustion chamber;
   a plurality of optical wave guides having a first respective end mounted in proximity to said light source and a second respective end mounted in said optical pathway to said respective combustion chamber;
   a timing device for selectively timing transmission of said light through said respective optical wave guides to each of said combustion chambers to promote combustion within said combustion chamber;
   said igniter having a housing that is mounted to said engine housing;
   said optical pathway passing through said igniter housing;
   said second end of said optical wave guide being mounted to said igniter housing in said optical pathway.

18. An internal combustion engine having a housing with a plurality of combustion chambers, the improvement characterized by;
   a single ultraviolet light source being positioned externally of said engine housing;
   each combustion chamber having an optical pathway to provide entry of said light to said combustion chamber;
   a plurality of optical wave guides having a first respective end mounted in proximity to said light source and a second respective end mounted in said optical pathway to said respective combustion chamber;
   a timing device for selectively timing transmission of said light through said respective optical wave guides to each of said combustion chambers to promote combustion within said combustion chamber;
   said light source being mounted in a case;
   said optical wave guides being flexible optical fibers;
   said respective first ends of said optical fibers being connected to said case and pointed in the direction of said light source;
   said case being openable to expose said light source;
   said light source being removably mounted to terminals within said case.

19. In an internal combustion engine as defined in claim 18 further characterized by:
   said timing device including a movable optical shutter mounted in said case and being interposed between said ultraviolet light source and said respective first ends for said optical fibers.

20. An ignition system for an internal combustion engine having at least one combustion chamber, said ignition system characterized by;
   an ultraviolet light source;
   at least one igniter having a housing that is mountable to said engine housing for communication with said at least one combustion chamber;
   a respective optical pathway extending through each of said at least one igniter housing;
   at least one optical fiber having first end mounted in proximity to said light source, and a second end mounted in said respective optical pathway in said igniter housing for directing light from said light source through said optical pathway;
   said light source being mounted in a case;
   said first end of said at least one optical fiber being connected to said case and pointed in the direction of said light source;
   said timing device including a movable optical shutter mounted in said case and being interposed between said ultraviolet light source and said first end of said at least one optical fiber.

21. An igniter assembly for an internal combustion engine, said assembly characterized by:
   an igniter housing;
   said igniter housing having a mounting mechanism for affixing to an engine housing with its inner end in communication with a combustion chamber;
   said igniter housing having two electrodes with two distal ends of said electrodes spaced apart to form a gap therebetween in proximity to the inner end of said igniter housing;
   said igniter housing having an outer end section and inner end section with an optical passageway therethrough from said outer end section to said inner section, said igniter housing connectable to a light source at said optical passage with said optical passage aimed at said gap between said electrodes to direct light from said light source through said optical passage to said gap.

22. An ignition system for an internal combustion engine having at least one combustion chamber, said ignition system characterized by;
   an ultraviolet light source;
   at least one igniter having a housing that is mountable to said engine housing for communication with said at least one combustion chamber;
   said igniter housing operably connected to a voltage source to form an ignition spark for ignition of combustion within said combustion chamber;
   a respective optical pathway extending through each of said at least one igniter housing;
   at least one optical fiber having first end mounted in proximity to said light source, and a second end mounted in said respective optical pathway in said igniter housing for directing light from said light source through said optical pathway.

23. An ignition system as defined in claim 20 further characterized by:
   a timing device for selectively timing transmission of said light from said light source through said respective optical fiber.

24. An ignition system as defined in claim 23 further characterized by:
   said case being openable to expose said light source;
   said light source being removably mounted to terminals within said case.

25. An igniter assembly as defined in claim 23 further characterized by:
   said optical passage being connectable to said light source via an optical fiber having one end positioned in proximity to said light source and a second end connected to said outer end section of said igniter housing at said optical passage.

26. In an internal combustion engine having a housing with at least one combustion chamber, the improvement characterized by:

an ultraviolet light source being positioned externally of said engine housing;

each combustion chamber having an optical passage to provide entry of said light to said combustion chamber;

an optical fiber having a first end mounted in proximity to said light source and a second end mounted in said respective optical passage;

said light source being mounted in a case;

said respective first end of said optical fiber being connected to said case and pointed in the direction of said light source;

said case being openable to expose said light source; and said light source being removably mounted to terminals within said case.

27. In an internal combustion engine as defined in claim 26 further characterized by:

a timing device for selectively timing transmission of said light through said optical fiber to said combustion chamber to promote combustion within said combustion chamber;

said timing device including a movable optical shutter mounted in said case and being interposed between said ultraviolet light source and said first end of said optical fiber.

28. An igniter assembly for an internal combustion engine, said assembly characterized by:

an igniter housing;

said igniter housing having a mounting mechanism for being affixable to an engine housing with its inner end in communication with a combustion chamber;

said igniter housing constructed to be connectable to a voltage source such that its inner end operable connected to said voltage source to provide electrical voltage ignition to said combustion chamber;

said igniter housing having an outer end section and inner end section with an optical passageway therethrough from said outer end section to said inner end section, said igniter housing connectable to a light source at said optical passage with said optical passage aimed within said combustion chamber to direct light from said light source through said optical passage to said combustion chamber.

* * * * *